(12) United States Patent
Schultze

(10) Patent No.: US 6,835,139 B2
(45) Date of Patent: Dec. 28, 2004

(54) UNIVERSAL JOINT HAVING A BALANCING ARRANGEMENT

(75) Inventor: Hans-Jürgen Schultze, Bottrop (DE)

(73) Assignee: Spicer Gelenkwellenbau GmbH & Co. KG (DE)

( * ) Notice: Subject to any disclaimer, the term of this patent is extended or adjusted under 35 U.S.C. 154(b) by 0 days.

(21) Appl. No.: 10/445,620

(22) Filed: May 27, 2003

(65) Prior Publication Data

US 2003/0224862 A1 Dec. 4, 2003

(30) Foreign Application Priority Data

May 28, 2002 (DE) .......................................... 102 23 849

(51) Int. Cl.[7] ................................................ F16D 3/41
(52) U.S. Cl. ..................................... 464/127; 464/130
(58) Field of Search ................................ 464/127–130, 464/123, 134, 136, 180

(56) References Cited

U.S. PATENT DOCUMENTS

| | | | | |
|---|---|---|---|---|
| 1,993,357 A | * | 3/1935 | Braun et al. ................ | 464/130 |
| 4,705,490 A | * | 11/1987 | Lindenthal .............. | 464/136 X |
| 5,746,658 A | * | 5/1998 | Duggan et al. ............. | 464/130 |
| 5,989,125 A | * | 11/1999 | Lindenthal .................. | 464/136 |

FOREIGN PATENT DOCUMENTS

EP          385176          2/1990

* cited by examiner

*Primary Examiner*—Greg Binda
(74) *Attorney, Agent, or Firm*—MacMillan, Sobanski & Todd, LLC

(57) ABSTRACT

A universal joint has a balancing arrangement that includes yoke arms having respectively, a support bore, centered on a common bore axis, and the support bore having a groove. A journal cross assembly comprises four journals, which axes intersect each other perpendicularly, and bearing bushings, having, respectively, a bottom, having an outer face, and in which bearing bushings, a journal is, respectively, supported. Respectively, one bearing bushing is received in a support bore and is secured by means of a retaining ring, engaging in the groove and supported on the outer face of the bottom of the corresponding bearing bushing. The retaining ring has a support portion on which radially inwards and projecting towards the bore axis, a holding portion is attached, axially offset to the support portion and distanced to the bottom, forming a gap. A balancing weight, formed as a ring discontinued at a point, can be retained in the gap between the bottom and the at least one holding portion.

10 Claims, 4 Drawing Sheets

UNIVERSAL JOINT HAVING A BALANCING ARRANGEMENT

BACKGROUND OF THE INVENTION

The invention relates to a universal joint having a balancing arrangement.

European Patent Application Publication No. 385,176 A1, incorporated herein by reference, describes a balancing arrangement for a universal joint shaft in which a separate fixing ring, together with a connection tube, is fixed on a universal joint. The fixing ring encloses a partial length portion of the connection tube. On the outer face of the fixing ring, individual balancing weights can be attached by means of point welding. This arrangement, however, does not allow, especially during repair works of a joint shaft and the renewed balancing, a destruction-free disassembly. Furthermore, for such an arrangement, a high expenditure method has to be carried out, as special devices are necessary by which the balancing weights can be welded on. A faulty attachment can also only be corrected by means of a destruction. Furthermore, the position for the attachments of the balancing weights is not optimal, as the largest imbalance lies in the universal joint itself. Further, in short universal joint couplings, in which practically no connection tube is provided, up to now it was only possible to remove the masses by means of drilling-out, which leads, however, to the disadvantage, that a weakening results.

SUMMARY OF THE INVENTION

The invention, therefore, has the object to provide a universal joint having a balancing arrangement that can be made in a simple and reproducible manner and also allows in a simple way a balancing during repair works.

This object is achieved according to the invention by a universal joint having a balancing arrangement comprising two joint yokes, having, respectively, two yoke arms, in which, respectively, a support bore, centered on a common bore axis, is arranged. The support bore has a groove. The balancing arrangement further includes a journal cross assembly having four journals, of which, respectively, two are arranged on a common axis and intersect each other perpendicularly. Bearing bushings are supported on the journals and have, respectively, a bottom and an outer face. A bearing bushing is received, respectively, in each of the support bores. A retaining ring is provided in each support bore and serves to fix the bearing bushing. To accomplish this, the retaining ring engages in the groove of the support bore and is supported on the outer face of the bottom of the corresponding bearing bushing. The retaining ring has a support portion arranged radially outwardly in reference to the bore axis and abuts the bottom of the bearing bushing. The retaining ring has at least one holding portion pointing radially inwardly to the bore axis, which is axially off-set in reference to the support portion and is distanced to the bottom, thereby forming a gap. The balancing arrangement further including a balancing weight, formed as a ring, interrupted at one point, and retainable in the gap between the bottom and the at least one holding portion.

In the embodiment, it is advantageous that the balancing weight is attached where the imbalances in a universal joint are concentrated. Furthermore, it is advantageous that in case of repair works, a simple re-balancing is possible as the balancing weights are attached removably. At the same time, it is easily possible to increase the balancing accuracy by means of exchanging the weights during the balancing.

Preferably, on the support portion, three holding portions for retaining the balancing weight are provided. These are distributedly arranged on the support portion. For a secure retainment of the balancing weight, it is provided that each holding portion and the balancing weight have a first and a second contact face, respectively, which contact each other, wherein at least one of the contact faces forms part of a face of an envelope of a cone approaching away from the bore axis along the outer face of the bottom. In this case, the faces contacting each other can be formed concerning their extension path in such a way that a self-locking is achieved and, therefore, a detaching is prevented. Forces that act in the direction towards the bottom of the bearing bushing do not act on to the balancing weight, as they are directly introduced into the yoke arms of the corresponding joint yoke by means of the retaining ring.

For fixing, the balance weight has a fixing portion radially at the outside in reference to the bore axis, the fixing portion engaging in the gap of the retaining ring.

An advantageous solution is where the balancing weight has balancing segments, and the balancing segments are attached on the fixing portion radially towards the bore axis. In this case, the balancing segments can be individually detachable from the fixing portion and/or from each other.

To be able to mount the balancing weight in a simpler way, it has at least one slot extending, starting from an inner contour, radially to the outside into the fixing portion. Balancing weights with different masses can also be formed in such a way that the balancing segments in their thickness are formed differently and have different dimensions in radial direction at a constant thickness.

A universal joint shaft, in which a universal joint is provided with a balancing arrangement according to the invention, and different design possibilities for the balancing weights are represented schematically in the drawing and are described by means of these.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
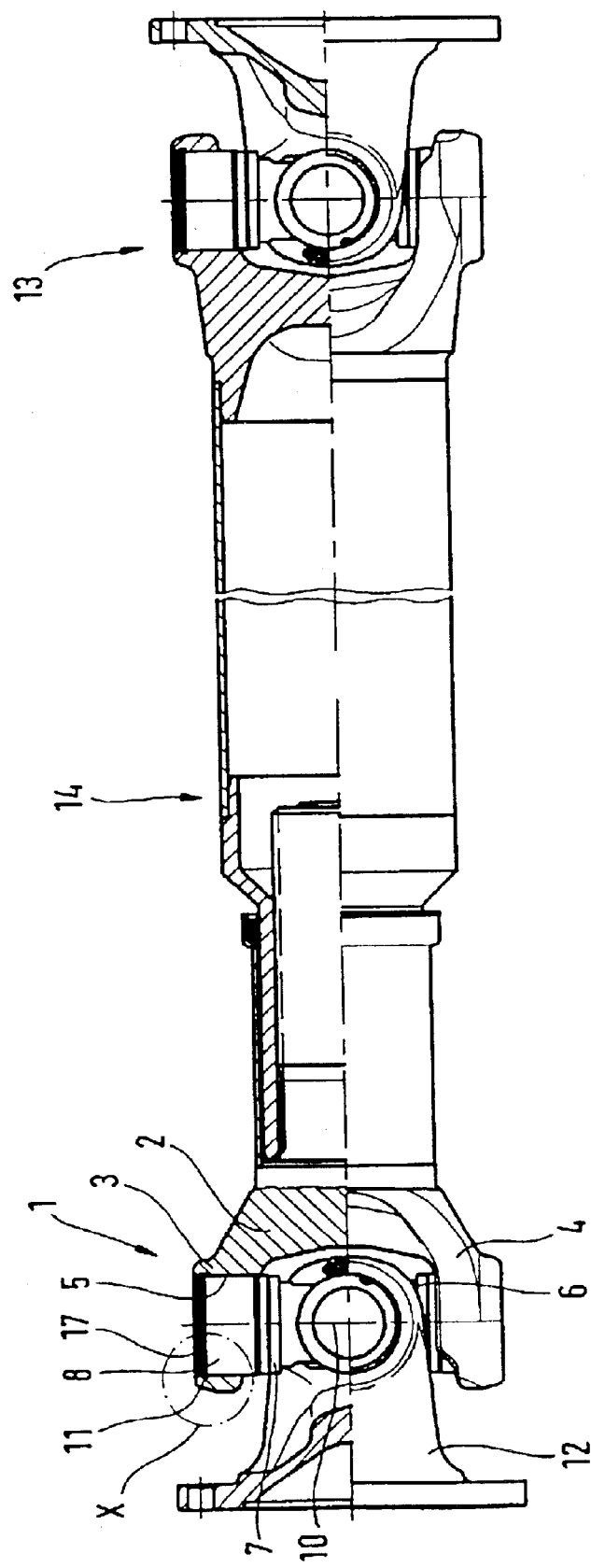
FIG. 1 shows a universal joint shaft having a balancing arrangement according to the invention.

FIG. 1 shows a universal joint shaft including a first universal joint 1 having a first joint yoke 2 with a first yoke arm 3 and distanced thereto a second yoke arm 4. Through both yoke arms 3 and 4 a support bore 5 extends. Both support bores 5 (only one is illustrated) are centered on a bore axis 10. In the support bores 5 of the two yoke arms 3 and 4, a pair of bearing bushings 8 are received. The bearing bushings 8 are supported on journals 7. These, together with a journal cross 6, form the first half of a journal cross assembly. The journal cross 6 has, furthermore, two further journals that are arranged perpendicularly to the first journals 7 and, together with these, in the same plane.

In the support bore 5, a groove 11 is arranged. In this groove 11, a retaining ring 17 rests, supporting the bearing bushing 8 along the bore axis 10. The two further journals of the journal cross 6, supporting also bearing bushings, are held in the yoke arms of a second joint yoke 12 according to the arrangement, as described in connection with the first joint yoke 2. The above described components form together the first universal joint 1. A second universal joint 13 corresponding to the universal joint 1 is arranged on an end of a connection shaft 14 distanced from the first joint yoke 2, and which connection shaft 14 allowing a length adjustment in a telescopic manner.

Figure 2:
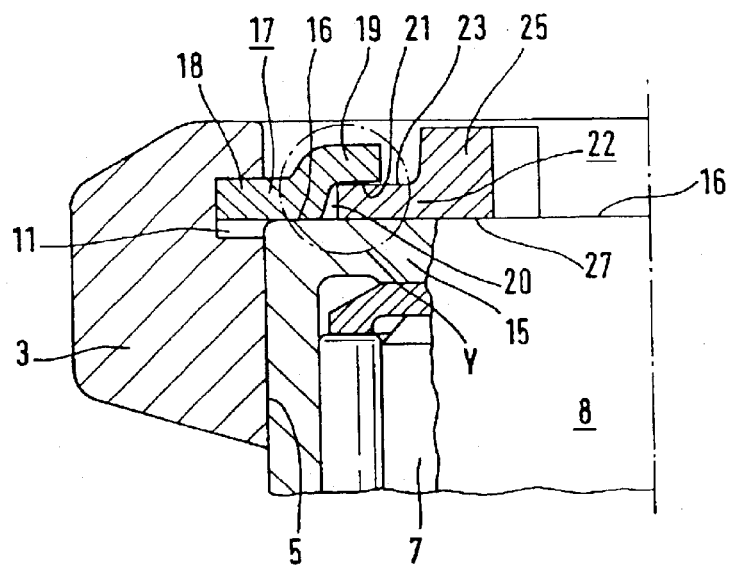
FIG. 2 shows a cross-sectional view of the detail X of FIG. 1 in an enlarged scale.
Figure 3:
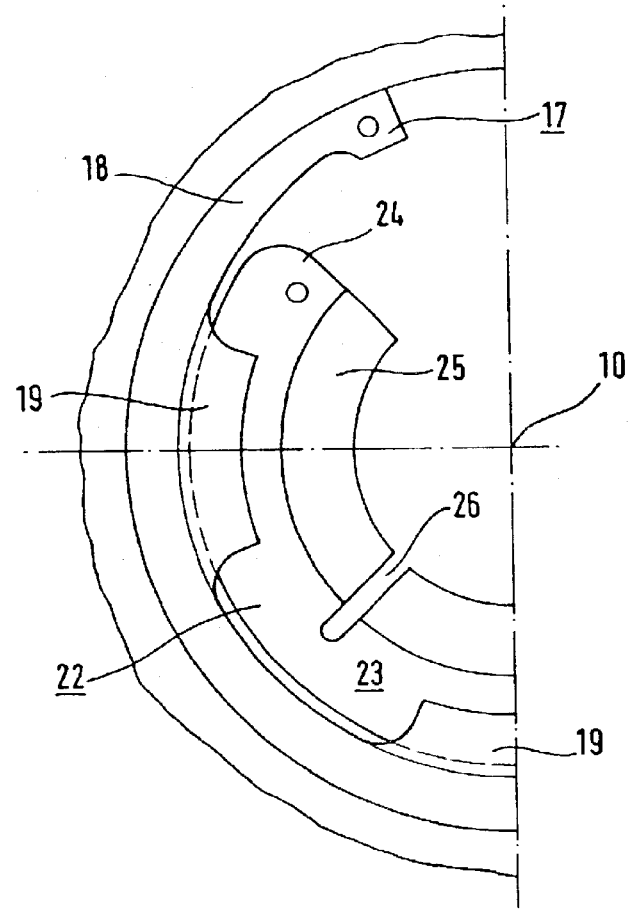
FIG. 3 shows a top view of FIG. 2.
Figure 4:
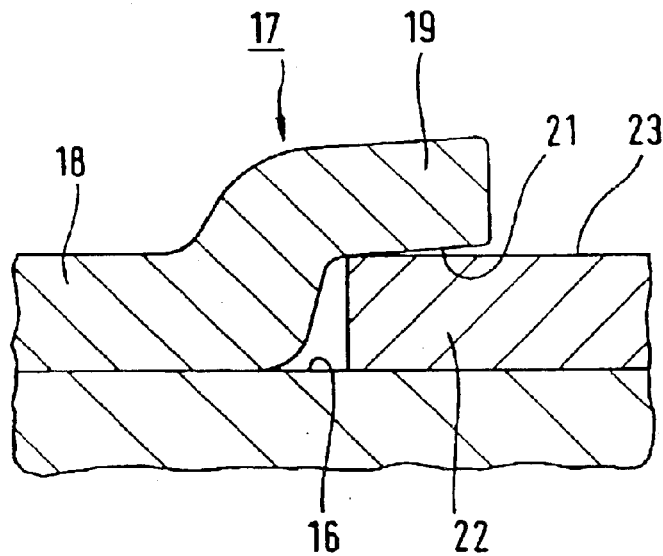
FIG. 4 shows the detail Y of FIG. 2 in an again enlarged scale of a first embodiment of a balancing weight.

The balancing arrangement is firstly described as follows by means of FIGS. 2, 3, 4, and 6. FIGS. 2 and 3 show the first yoke arm 3 of the first joint yoke 2 having the support bore 5. It has the bore axis 10. In the support bore 5, the journal 7 of the journal cross 6 is received by means of interposition of rolling members and the bearing bushing 8. The bearing bushing 8 has a bottom 15 with an outer circumferential face 16. In the support bore 5, in the area of the bottom 15, the groove 11 extends continuously around the bore axis 10. The balancing arrangement comprises the retaining ring 17 having a support portion 18 engaging in the groove 11 and abutting, furthermore, the outer face 16 of the bottom 15 of the bearing bushing 8. Hereby, the journal cross 6 is held centered in the direction of the bore axis 10 between the two yoke arms 3 and 4 of the first joint yoke 2. The retaining ring 17 is, as shown in FIG. 3, formed open at a point in the circumferential direction so that it can be reduced in diameter by a suitable tool and can be pushed into the support bore 5 such that it enters the groove 11. On the support portion 18, three holding portions 19 are distributedly arranged around the circumference and are attached radially towards the inside, which are cranked or angled, furthermore, in reference to the path of extension of the support portion 18, so that towards the outer face 16 of the bottom 15 of the bearing bushing 8, a gap 20 is formed that is open towards the bore axis 10. Distanced from the outer face 16 of the bottom 15 of the bearing bushing 8 and opposed thereto, the holding portions 19 have a first contact face 21, as especially shown in FIG. 4, which is shown as a part of an envelope or surface of a cone that is centered on the bore axis 10, and which envelope of a cone approaches the outer face 16 of the bottom 15 as it extends outwardly from the bore axis 10. Balancing weights 22 of different masses can be arranged to the retaining ring 17. These balancing weights 22 are formed similar to the retaining ring 17 and have radially, in reference to the bore axis 10, on the outside, a fixing portion 24 that enters the gap 20. Continuous with the fixing portion 24 and radially inwards towards the bore axis 10, balancing segments 25 are arranged. The balancing segments 25 are separated from each other by means of a slot 26. FIG. 3 shows, respectively, only one half of the retaining ring 17 and of the annular balancing weight 22. Altogether, two slots 26 are provided, starting from the inner contour of the balancing segments 25 and extending radially into the fixing portion 24. From FIG. 2, it can be seen that the balancing segments 25 differ in reference to their thickness from the portion of the balancing weight 17, having a second contact face 23 contacting the first contact face 21 of the holding portion 19. In the embodiment of FIGS. 2, 3, and 4, the second contact face 23 and a face 27 supported on the outer face 16 of the bottom 15, extend parallel.

Figure 5:
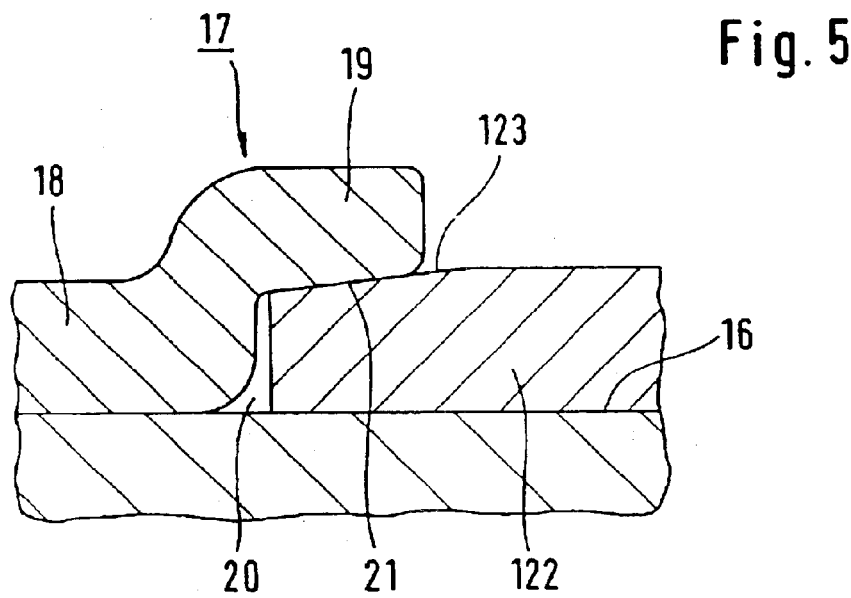
FIG. 5 show the detail Y of FIG. 2 in an again enlarged condition with an alternative embodiment of a balancing weight.

In the embodiment of a balancing weight 122 of FIG. 5, the second contact face 123 extends corresponding to the path of extension of the first contact face 21 of the holding portion 19 of the retaining ring 17, fitting same in form of a partial envelope of a cone.

Figure 7:
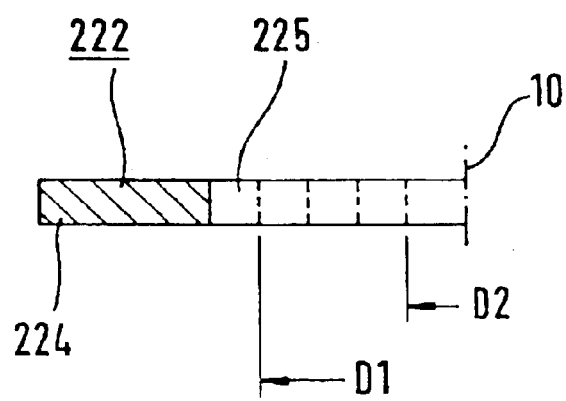
FIG. 7 shows a half cross-sectional view through a further embodiment of a balancing weight.

While in the embodiment of FIGS. 2 and 3, the individual balancing weights 22 can differ from each other according to their masses in such a way that they have a different thickness, it is provided in the embodiment of a balancing weight 222 of FIG. 7 that the balancing segments 225 attached on the fixing portion 224 in radial direction towards the bore axis 10 have different radial dimensions so that inner diameters D1 and D2 with different sizes are achieved.

Figure 6:
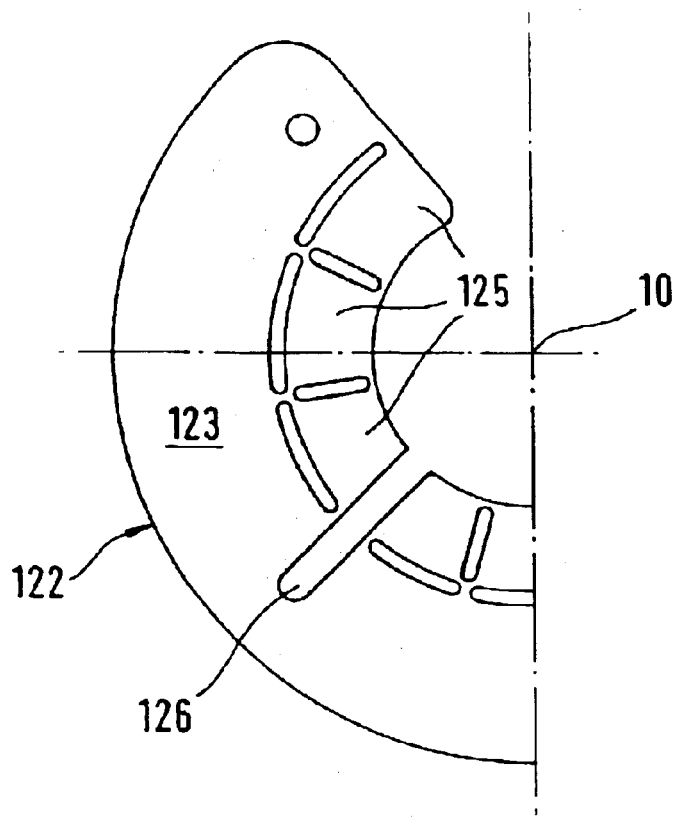
FIG. 6 shows a representation of a half of the first embodiment of the balancing weight of FIG. 5.

From the embodiment of FIG. 6, it also can be taken that the individual balancing weights 125 are separated from each other by means of notches so that they are removable to be able to produce the correct mass for the desired balancing quality.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A universal joint having a balancing arrangement comprising:
   two joint yokes having, respectively, two yoke arms in which, respectively, a support bore, centered on a common bore axis, is arranged, the support bore having a groove;
   a journal cross assembly having four journals of which, respectively, two are arranged on a common axis, which axes intersect each other perpendicularly, having bearing bushings having, respectively, a bottom and an outer face, and in which bearing bushes, respectively, a journal is supported, wherein, respectively, the bearing bushings are received in the support bores;
   a retaining ring provided in each support bore and serving to fix the bearing bushing and for this, engaging in the groove of the support bore supporting on the outer face of the bottom of the corresponding bearing bushing, the retaining ring having a support portion arranged radially outwardly in reference to the bore axis and abutting the bottom on which pointing radially inwardly to the bore axis, at least one holding portion is attached that is axially off-set in reference to the support portion and is distanced to the bottom, thereby forming a gap; and
   a balancing weight formed as a ring, interrupted at one point, and retainable in the gap between the bottom and the at least one holding portion.

2. The universal joint according to claim 1, characterized in that three holding portions are attached distributedly on the support portion.

3. The universal joint according to claim 2, characterized in that each holding portion and the balancing weight have a first and a second contact face, respectively, that contact each other, wherein at least one of the contact faces forms a part of a face of an envelope of a cone, which approaches the outer face of the bottom as it extends outwardly from the bore axis.

4. The universal joint according to claim 1, characterized in that each holding portion and the balancing weight have a first and a second contact face, respectively, which contact each other, wherein at least one of the contact faces forms a part of a face of an envelope of a cone that, away from the bore axis, approaches the outer face of the bottom.

5. The universal joint according to claim 1, characterized in that the balancing weight has, in reference to the bore axis, radially outside, a fixing portion, the fixing portion engaging in the gap of the retaining ring.

6. The universal joint according to claim 5, characterized in that the balancing weight has balancing segments, and that the balancing segments are attached on the fixing portion radially towards the bore axis.

7. The universal joint according to claim 5, characterized in that the balancing segments are individually detachable from the fixing portion.

8. The universal joint according to claim 7, characterized in that the balancing segments are individually detachable from one another.

9. The universal joint according to claim 5, characterized in that the balancing segments are individually detachable from one another.

10. The universal joint according to claim 5, characterized in that the balancing weight has at least one slot extending, starting from an inner contour, radially to the outside into the fixing portion.

* * * * *